US008412359B2

(12) United States Patent
Boleko Ribas

(10) Patent No.: US 8,412,359 B2
(45) Date of Patent: Apr. 2, 2013

(54) LIGHT CONTROL SYSTEM AND METHOD FOR AUTOMATICALLY RENDERING A LIGHTING SCENE

(75) Inventor: Salvador Expedito Boleko Ribas, Barcelona (ES)

(73) Assignee: Koninklijke Philips Electronics N.V., Eindhoven (NL)

( * ) Notice: Subject to any disclaimer, the term of this patent is extended or adjusted under 35 U.S.C. 154(b) by 412 days.

(21) Appl. No.: 12/740,375

(22) PCT Filed: Nov. 3, 2008

(86) PCT No.: PCT/IB2008/054558

§ 371 (c)(1),
(2), (4) Date: Apr. 29, 2010

(87) PCT Pub. No.: WO2009/060369

PCT Pub. Date: May 14, 2009

(65) Prior Publication Data

US 2010/0259197 A1 Oct. 14, 2010

(30) Foreign Application Priority Data

Nov. 6, 2007 (EP) .................................... 07120082

(51) Int. Cl.
*G05B 11/01* (2006.01)
*G05B 13/02* (2006.01)

(52) U.S. Cl. ................ 700/54; 700/11; 700/12; 700/19; 700/28; 700/29

(58) Field of Classification Search .............. 700/11–12, 700/19, 28–29, 54
See application file for complete search history.

(56) References Cited

U.S. PATENT DOCUMENTS

| | | | | |
|---|---|---|---|---|
| 4,347,461 | A * | 8/1982 | Carlson | 315/158 |
| 4,695,769 | A | 9/1987 | Schweickardt | |
| 5,061,997 | A | 10/1991 | Rea et al. | |
| 5,565,918 | A * | 10/1996 | Homma et al. | 348/364 |
| 5,726,437 | A * | 3/1998 | Ashikaga et al. | 250/205 |
| 6,118,231 | A | 9/2000 | Geiginger et al. | |

(Continued)

FOREIGN PATENT DOCUMENTS

| | | |
|---|---|---|
| EP | 1067825 B1 | 1/2001 |
| WO | 0237454 A2 | 5/2002 |

OTHER PUBLICATIONS

Johnson et al: "Sharpness Rules"; Proceedings of the Color Imaging Conference, 2000, vol. 1, pp. 24-30.

(Continued)

*Primary Examiner* — Ronald Hartman, Jr.
(74) *Attorney, Agent, or Firm* — Mark L. Beloborodov

(57) ABSTRACT

The invention relates to the automatic rendering of a lighting scene with a lighting system, particularly the control of the rendering. A basic idea of the invention is to improve rendering of a lighting scene by automatically compensating interference, such as an alien light source or a dynamic perturbing event of a rendered lighting scene. An embodiment of the invention provides a light control system (10) for automatically rendering a lighting scene with a lighting system, wherein the light control (10) system is adapted for monitoring the rendered lighting scene for the occurrence of interference (14, 20, 22, 24) and automatically reconfiguring the lighting system such that a monitored occurrence of an interference is compensated (16, 18, 12). As result, the invention allows to prevent dynamic disturbances or unforeseen events, for example caused by faulty or alien light sources, from distorting the rendering of an intended lighting scene.

5 Claims, 2 Drawing Sheets

U.S. PATENT DOCUMENTS

Figure 1:
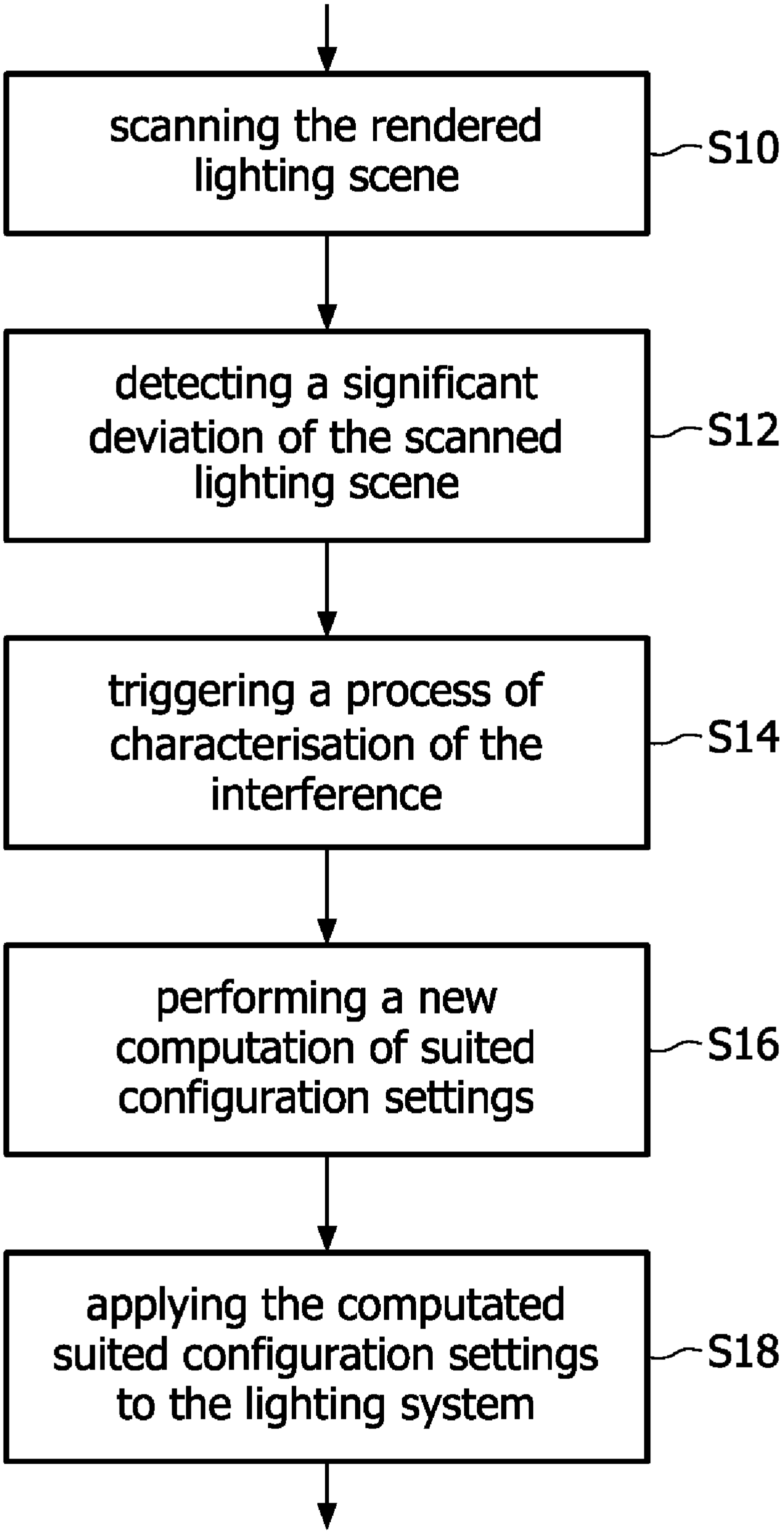

| | | | | |
|---|---|---|---|---|
| 6,941,027 | B1 * | 9/2005 | Gallagher | 382/274 |
| 7,852,017 | B1 * | 12/2010 | Melanson | 315/291 |
| 7,903,962 | B2 * | 3/2011 | Takita | 396/155 |
| 8,009,042 | B2 * | 8/2011 | Steiner et al. | 340/541 |
| 8,280,558 | B2 * | 10/2012 | Picco | 700/295 |
| 2002/0110376 | A1 * | 8/2002 | MacLean et al. | 396/429 |
| 2002/0180973 | A1 * | 12/2002 | MacKinnon et al. | 356/425 |
| 2004/0002792 | A1 | 1/2004 | Hoffknecht | |
| 2004/0153284 | A1 * | 8/2004 | Bernstein et al. | 702/178 |
| 2006/0076908 | A1 | 4/2006 | Morgan et al. | |
| 2006/0132859 | A1 * | 6/2006 | Kalapathy et al. | 358/463 |
| 2008/0088244 | A1 * | 4/2008 | Morishita | 315/154 |
| 2008/0265799 | A1 | 10/2008 | Sibert | |
| 2010/0253244 | A1 * | 10/2010 | Snook et al. | 315/307 |
| 2010/0283883 | A1 * | 11/2010 | Sato et al. | 348/335 |
| 2011/0037403 | A1 * | 2/2011 | DeVincentis et al. | 315/248 |
| 2012/0051635 | A1 * | 3/2012 | Kunkel et al. | 382/165 |

OTHER PUBLICATIONS

Debevec et al: "Recovering High Dynamic Range Radiance Maps From Photographs"; Proceedings ACM SIGGRAPH, vol. 31, Aug. 1997, pp. 369-378.

Zhao et al: "Lighting Landscape Analysis and Its Mathematic Model":(No. 096) Architecture and Civil Engineering School, Shenzhen University, 11 Page Document, Downloaded From http://www.rightlight6.org/english/proceedings/Poster_Session/Lighting_Landscape_Analysis/f096zhao.doc.

El-Nasr et al:"Automating Lighting Design for Interactive Entertainment"; ACM Computers in Entertainment, vol. 2, No. 2, Apr. 2004, Article 05, 19 Page Document.

* cited by examiner

LIGHT CONTROL SYSTEM AND METHOD FOR AUTOMATICALLY RENDERING A LIGHTING SCENE

The invention relates to the automatic rendering of a lighting scene with a lighting system, particularly the control of the rendering.

Technological developments in lighting modules, for example solid-state lighting, allow for creation of elaborated lighting atmospheres or scenes, which benefit from the use of enhanced illumination features like colour, (correlated) colour temperature, variable beam width etcetera. In order to efficiently control the numerous control parameters of these lighting modules advanced light controls systems were developed, which are able to assist an end-user in configuring the settings of the lighting modules. These advanced light control systems may be also able to automatically render certain lighting atmospheres or scenes in a room, for example from a XML file containing an abstract description of a certain lighting atmosphere or scene, which is automatically processed for generating control values or parameters for the lighting modules of a concrete lighting infrastructure. Generally, lighting atmospheres or scenes can be defined as a collection of lighting effects that harmoniously concur in space and time.

However, the occurrence of unexpected events as for instance the malfunction of any of the involved light sources, the unexpected incorporation of a light source alien to the lighting control system, i.e. non-controlled by the system, to the rendering of the intended scene, or the dynamics of sunlight might have as consequence the ruin of the rendered scene. Moreover, the effect of a perturbation becomes even more perceivable whenever colour light is used to realize the said atmospheres or scenes. Non-desired and perturbing effects are herein generally denoted as interference to a rendered lighting atmosphere or scene.

U.S. Pat. No. 6,118,231 discloses a control system and device for controlling the luminosity in a room lighted with several light sources or several groups of light sources. In order to control the luminosity, a system is used with which the ratio between the light intensities of the individual light sources or groups of light sources can be adjusted or modified, and with which the total luminosity in the room can be adjusted or modified while the ratio between the light intensities of the individual light sources or groups of light sources is kept constant. In particular for this purpose, a control device is integrated in the system and connected to all operating devices of the various light sources to control the power consumption of the individual light sources. The system may be further configured to control not only artificial light sources but also daylight entering a room, the light intensity of which may be regulated via room darkening devices.

It is an object of the present invention to provide an improved light control system and method for automatically rendering a lighting scene.

The object is solved by the independent claims. Further embodiments are shown by the dependent claims.

A basic idea of the invention is to improve rendering of a lighting scene by automatically compensating interference, such as an alien light source or a dynamic perturbing event of a rendered lighting scene. Particularly, if an interference of a rendered lighting scene is detected and deemed reasonable, it may be characterized and its characterisation may then be used to reconfigure the rendered lighting scene. As result, the invention allows to prevent dynamic disturbances or unforeseen events, for example caused by faulty or alien light sources, from distorting the rendering of an intended lighting scene. Also, if sunlight is perceived or identified as a disturbance, the invention allows to implicitly enabling daylight harvesting bringing about increased energy efficiency to a lighting system.

The term "interference" as used herein should be understood as comprising any effect that causes a deviation of a lighting atmosphere or scene from an intended lighting atmosphere or scene to be automatically rendered by a light control system. For example, interference may be any non-desired and perturbing effect to a rendered lighting scene, caused for example by the malfunction of any of the involved light sources, the unexpected incorporation of a light source alien, i.e. non-controlled by the system, to the rendering of the intended lighting scene, or the dynamics of sunlight.

An embodiment of the invention provides a light control system for automatically rendering a lighting scene with a lighting system, wherein the light control system is adapted for monitoring the rendered lighting scene for the occurrence of interference, and automatically reconfiguring the lighting system such that a monitored occurrence of interference is compensated.

Thus, a closed-loop control strategy may be implemented in a light control system. In contrast to closed-loop strategies, which are only applied to mainly perform daylight harvesting, where sunlight is benefited from in order to increase energy efficiency, the inventive system allows an autonomous reconfiguration of the lighting infrastructure in case of occurrence of interference.

The monitoring of the rendered lighting scene for the occurrence of interference may comprise according to a further embodiment of the invention scanning the rendered lighting scene, and detecting a significant deviation of the scanned lighting scene with respect to a reference lighting scene.

The scanning of the rendered lighting scene may be for example preformed by taking sensorial reading of the scene, for example with special light detectors or sensors, a camera, or a wide-area photodetector.

In a further embodiment of the invention, the scanning of the rendered lighting scene may comprise taking samples at given measurement points over a period of time, and the detecting of a significant deviation may comprise processing the samples.

For example, the processing of the samples may be performed by a dedicated algorithm, which may be executed by a processor.

The processing of the samples may comprise comparing the samples with reference values, according to a further embodiment of the invention. The reference values may by devised from a reference lighting scene, for example samples taken at certain reference positions in a room in which the lighting scene is created with a lighting system. Typically, the reference values are devised from a lighting scene, which is automatically created by the light control system after end-user fine-tuning. The reference values may be stored in a database of the light control system. They may be also updated from time to time, particularly after adjusting the lighting scene by an end-user.

The comparing of the samples with reference values may comprise in embodiments of the invention one of the following:

averaging over regions of interest a computed difference between readings of a user-tuned lighting scene and the rendered lighting scene, low-pass filtering the computed difference, and comparing the low-pass filtered computed difference with a threshold value in order to determine whether a significant variation in the mean of samples has occurred during the last observed periods of time; or defining a time window embracing the last periods of time previous to a current sample, estimating a predictor, for example a linear predictor, from the samples taken during the defined time window, running a generalised likelihood ratio test, and comparing the result of the generalised likelihood ratio test with a threshold value in order to determine whether a change has occurred in the monitored magnitude over a certain region of interest.

The first solution for the comparison of samples with reference values may be implemented with relatively low computing costs. The second solution is a more robust solution for detecting the presence of alien light sources or removal or malfunction of light sources of the used lighting system.

An embodiment of the invention provides that the automatically reconfiguring the lighting system may comprise triggering a process of characterisation of an interference from the detected significant deviation, and performing a computation of configuration settings for the lighting system to counteract the characterized interference depending on the characterisation.

The characterisation of the interference may serve to test whether at the areas with interferences a deviation from the desired lighting scene is large enough to make it advisable to render a new lighting scene.

The system may be in a further embodiment of the invention adapted to perform methods that enable the evaluation of lighting control commands from given specifications of light effects. This allows to further improve the rendering of a lighting scene.

Furthermore, in an embodiment of the invention, the system may further comprise photometric characteristic plots or mathematical models therefrom derived, which characterize the behaviour of the hardware of the lighting system to be controlled. Thus, the rendering of a lighting scene may be better adapted to the perception by end-users.

The photometric characteristic plots or models may in an embodiment of the invention provide the relationship between configuration settings of light modules of the lighting system and an expected output of the light modules at reference points or work surfaces.

The system may further comprise in an embodiment of the invention tools being adapted to allow an end-user to fine-tune the automatically rendered lighting scene according to the end-user preference. For example, the tools may be a computer executing dedicated control software for fine-tuning the lighting scene rendered by the light control system. The computer may be connected to the light control system, for example via a wired or wireless connection. The control software may be adapted to generate control signals to be transmitted to the light control system for fine-tuning a rendered lighting scene.

According to a further embodiment of the invention, the system may be adapted to perform evaluation methods and may comprise accuracy boundaries that enable an evaluation of the occurrence of a statistical change in magnitudes in the rendered lighting scene, which is monitored with the light control system, and a decision-making about the need of reconfiguration of the lighting system.

The system may further comprise in an embodiment of the invention processing units being adapted to exploit antecedent items to evaluate lighting configuration settings that fit to a specified lighting scene.

According to an embodiment of the invention, the system may further comprise communication technologies and a network infrastructure being adapted to substantiate the exchange of information among all sensors, processors and actuators of the light control system, which are involved in the process of automatically rendering the lighting scene.

A further embodiment of the invention provides a light control method for automatically rendering a lighting scene with lighting system, comprising monitoring the rendered lighting scene for the occurrence of an interference, and automatically reconfiguring the lighting system such that a monitored occurrence of an interference is compensated.

According to a further embodiment of the invention, a computer program may be provided, which is enabled to carry out the above method according to the invention when executed by a computer.

According to a further embodiment of the invention, a record carrier storing a computer program according to the invention may be provided, for example a CD-ROM, a DVD, a memory card, a diskette, or a similar data carrier suitable to store the computer program for electronic access.

Finally, an embodiment of the invention provides a computer programmed to perform a method according to the invention and comprising an interface for communication with a lighting system.

These and other aspects of the invention will be apparent from and elucidated with reference to the embodiments described hereinafter.

The invention will be described in more detail hereinafter with reference to exemplary embodiments. However, the invention is not limited to these exemplary embodiments.

Figure 2:
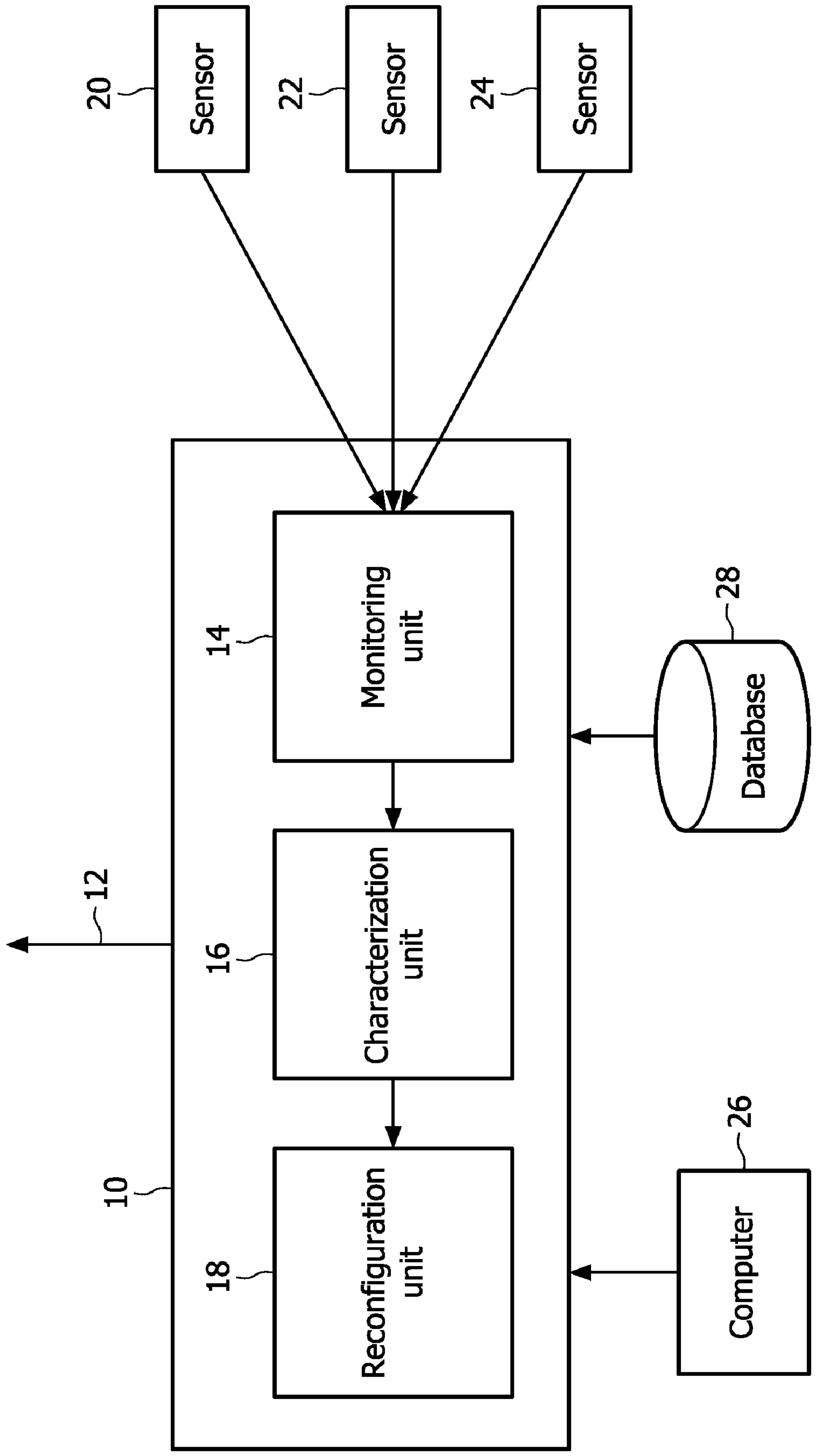

FIG. 1 a flow chart of an embodiment of a method for automatically rendering a lighting scene according to the invention; and FIG. 2 a block diagram of an embodiment of a system for automatically rendering a lighting scene according to the invention.

In the following, functionally similar or identical elements may have the same reference numerals.

The implicit redundancy, which is needed for complex lighting atmosphere creation, supplied by the light modules can be exploited by a lighting control system to provide enhanced performance and increased dependability of the lighting system through on-line reconfiguration strategies.

The description hereinafter discloses how this can be achieved by means of a feedback control strategy, wherein the rendered scene is actively monitored and analysed to observe any possible perturbation of a lighting scene or atmosphere. If any perturbation or interference is detected and deemed reasonably disturbing/annoying, the system may characterise it, and uses this knowledge while running algorithms involved in the computation of the configuration settings for a lighting system.

As a result, it is possible to prevent dynamic disturbances or unforeseen events (faulty or alien to the control system light sources) from distorting the rendering of the intended lighting scene whereas when sunlight acts as disturbance, daylight harvesting is implicitly enabled bringing about increased energy efficiency to the lighting control system.

The herein presented embodiments of the invention may integrate as main elements one or more of the following:

Methods that enable the evaluation of lighting control commands from given specifications of light effects.

Photometric characteristic plots or models therefrom, that characterise the behaviour of the installed lighting hardware. They provide the relationship between the configuration settings of the light modules and the (expected) output of light modules at reference points or work surfaces.

Suited tools allowing an end-user to fine-tune the initially automatically rendered according to the end-user preference.

Suited photo-sensors, which during run-time of the lighting system collect readings of light-related magnitudes at (on) reference measurement points (work surfaces).

Methods, and well defined accuracy boundaries that enable the evaluation of the occurrence of a statistical change in the monitored magnitudes in the rendered lighting scene and the decision-making about the need of reconfiguration of the lighting system.

Processing units that exploit the antecedent items to evaluate the lighting configuration settings that fit to the specified lighting scene.

Communication technologies and network infrastructure to substantiate the exchange of information among all the involved sensors, processors and actuators.

FIG. 1 shows a flowchart of a method for automatically rendering a lighting scene according to the invention. The method comprises the following essential steps:

Step S10: scanning a lighting scene automatically rendered by a light control system which accordingly configures a lighting system.

Step S12: detecting a significant deviation of the scanned lighting scene with respect to a reference lighting scene.

Step S14: triggering a process of characterisation of interference from the detected significant deviation.

Step S16: performing a computation of configuration settings for the lighting system to counteract the characterized interference depending on the characterisation.

Each of the above steps may comprise several sub-steps performing further analysis or processing of the scanned rendered lighting scene, as will be described in the following in more detail.

Step S10 may comprise the actively scanning of the rendered lighting atmosphere through sensorial readings. The sensorial input may be processed in order to seek for traces of any alien, faulty or removed light source (either artificial or natural). To that purpose an initial measurement of a user-tweaked lighting scene may be taken as a reference.

The detection of a significant deviation with respect to the reference lighting scene in step S12 triggers a process of characterisation of the interference in step S14 and accordingly a new computation of suited configuration settings to counteract it in step S16.

For further understanding of the steps S12 to S16, a lighting atmosphere is considered, which is rendered in a certain room. It is assumed that this atmosphere results from the operation of a light control system, which automatically computes the configuration settings needed by the installed lighting hardware, i.e. the lighting system, to render light distributions, and other light effects, at different areas of interest of the room.

The input given to the said system to represent the intended light distributions may consist in (preferably high-dynamic range as daylight might be involved) bitmaps (as described in the publication "Recovering high dynamic range radiance maps from photographs", Debevec P. E. and Malik J., Proceedings ACM SIGGRAPH, 31:369-378, August 1997), colour temperature, luminance or illuminance maps, etcetera. Henceforth, the atmosphere that has been automatically rendered by the system out of a specification is called zero scene. The outcome of photometric detectors in form of either pictures or readings is used to perform measurements at different areas of interest in the light atmosphere. Afterwards, the measures are stored in a data bank, for example as initial lighting scene or zero scene configuration. Then, the end-user is allowed to tweak the zero scene, according to her (his) own preference. To that purpose (s)he may use suited fine-tuning tools. Once the zero scene has been tuned according to user's liking, the resulting rendered scene is named tweaked scene. Then (s)he may be asked for conformity with the tweaking and after agreement, the same measurements performed on the zero scene are repeated for the tweaked scene and their values recorded in the mentioned data bank (the differences between the two sets of measurements should be, to some extent, representative of the changes brought about by the tweaking operations of the end-user). This process may be considered as initial system setup, since it usually takes place when an end-user initiates the rendering of a certain lighting scene and adjusts the zero scene in order to meet her/his preferences.

Then at regular time intervals, similar measurements and data recordings to those performed for the zero and tweaked scenes are realised, during step S10. The obtained results at the sampling instants are then compared to those attained for the tweaked scene (The tweaked scene is thus taken as the reference scene) in order to detect a significant deviation of the scanned tweaked lighting scene.

In the following, the detection through supervision and comparison to the tweaked scene is described, as it may be performed in one or both of steps S10 and S12.

The format of the data used by the light management system to automatically compute the settings of the controlled lighting fixtures determines the procedure followed to perform the comparison between the current status depicted by the readings at sampling time and the one of the tweaked scene. The purpose of the comparison is to find out whether a significant divergence from the tweaked scene has been observed. If this is the case, a new rendering of the lighting scene, which took into account the observed new boundary conditions, may be advisable.

Now, a collection of perhaps heterogeneous photometric detectors deployed at given locations of the room, which are taken as reference measurement points, is considered. $\rho_{j,k}[0]$ is the sensor reading at the kth measurement point in the tweaked (light) scene. j is a positive integer number ranging from 1 to $N_r$, where $N_r$ is the number of regions of interest monitored in the lighting scene. k is a positive integer number ranging from 1 to $N_j$, where $N_j$ is the number of measurement points that are monitored and are located in the jth region of interest in the lighting scene. Similarly, $\rho_{j,k}[i]$ stands for the sensor reading at the same measurement point done at the ith sampling time in the rendered lighting scene.

Many alternatives are possible in order to perform the comparison to reference values in order to detect the presence of interfering light sources. Hereinafter few of them are presented. The first option is realised by averaging over regions of interest the computed difference (subtraction) between the readings of the tweaked scene and the rendered lighting scene.

$$\delta\rho_j[i] = \frac{1}{N_j}\sum_{k=1}^{N_j}\rho_{j,k}[i] - \rho_{j,k}[0] \tag{1}$$

Then, the resulting differences (per area) are low-pass filtered by using a weighted mean of the last $N_w$ readings (please note that this implies that the number of observation periods exceeds $N_w$), where equal or higher weight coefficients (w) may be assigned to the more recent readings.

$$\delta r_j[i] = \sum_{l=i-N_w+1}^{i} w_{l+N_w-i}[i] \cdot \delta\rho_j[l] \quad (2)$$

Finally since under ideal conditions, that is in absence of interferers, the computed indexes are expected to be close to zero, they can be compared to threshold values ($\delta r_j^{thr}[i]$) (the higher the expected variance of the noise in the readings, the higher the chosen threshold values) to determine whether a significant variation in the mean of the photometric readings has occurred during the last observed $N_w$ periods of time, so that a new rendering of the scene is a sensible choice in order to compensate for the deviation from the intended lighting scene, that is the one tweaked by the user.

A second, more robust option to detect the presence of alien light sources, or alternatively the removal or malfunction of light sources used to render the desired scene, may consist in defining a (sliding) time window embracing the last $N_w$ periods of time previous to the current sampling instant, from whose readings a linear predictor, though either other linear (e.g. state-space) or non-linear models might be used instead, is estimated. Thus, it is assumed that for a linear predictor the following expression holds $$\begin{aligned}\delta r_j[i] &= \sum_{l=1}^{N_w} h_{j,l} \cdot r_j[i - N_w + l] + e_j[i] \\ &= h_j * \{r_j\}_{n-N_w+1}^{n}\Big|_{n=i} + e_j[i]\end{aligned} \quad (3)$$

But then, another linear predictor sharing the same structure with the previous one is computed, perhaps in an adaptive fashion for instance taking a recursive least squares approach, from all the past readings out of the said time window.

$$\delta r_j[n] = h_{j,0} * \{r_j\}_{n-N_w+1}^{n} + e_{j,0}[n] \quad (n \leq i - N_w) \quad (4)$$

If vector notation is adopted for the readings, then the prior equations can be expressed more compactly and conveniently as $$\Delta r_j[i] = \Phi_j[i]\theta_j + e_j[i]$$

$$\Delta r_j[i] = \Phi_j[i]\theta_{j,0} + e_{j,0}[i] \quad (5)$$

where the vector $\Delta r_j[i] = [\delta r_j[i-N_w+1] \ldots \delta r_j[i]]^T$ holds the actual measurements that fall inside the time window; the column vectors $\theta_j$ and $\theta_{j,0}$ hold the $N_p$ parameters that define both linear predictors, whilst the error vectors $e_j$ and $e_{j,0}$ hold the $N_w$ last prediction errors according to both predictors.

If it is assumed that the coefficients of the linear predictors have been estimated by means of a least squares approach and that prediction errors $e_j$ are not correlated and follow Gaussian distributions with zero mean, then the prediction error vector $e_j$ follows a multivariate Gaussian distribution whose mean is the null vector in $R^{Nw}$ and whose covariance matrix is $\Sigma_j$.

Then a generalised likelihood ratio test can be run so that the value $L_{GLR}$ can be computed as $$L_{GLR} = \frac{1}{2}\left((e_{j,0}[i])^T \sum\nolimits_j^* e_{j,0}[i] - (e_j[i])^T \sum\nolimits_j^* e_j[i]\right) \quad (6)$$

where $\Sigma_j^*$ results from computing the maximum likelihood estimator of $\Sigma_j$. To that purpose the following equations can be used to estimate it from values outside the time window.

$$\overline{e}_{j,0} = \frac{1}{i - 2N_w - l_0} \sum_{l=N_w+l_0}^{i-N_w} \Delta r_j[l] - \Phi_j[l]\theta_{j,0} \quad (7)$$

$$\Sigma_j^* = \frac{1}{i - 2N_w - l_0} \sum_{l=N_w+l_0}^{i-N_w} (e_j[l] - \overline{e}_{j,0})(e_j[l] - \overline{e}_{j,0})^T$$

If the value of $L_{GLR}$ exceeds a certain threshold value, then it is assumed that a change has been detected in the monitored magnitude over the jth region of interest. For further details on how the threshold value may be selected, references like "Detection of abrupt changes. Theory and Applications. Information and System Sciences.", Basseville M. and Nikiforov I. V., Prentice Hall, 1st edition, April 1993, and "Adaptive filtering and change detection", Gustafsson F., John Wiley and Sons, 1st edition, January 2000, can be checked.

Alternatively, if the photometric detector used for monitoring purposes is either a conventional camera or a wide-area photometer, which acquires still images of areas of interest, then the comparison can be made as follows. Also any other photometric sensor that yields tristimulus values as output or whose output can be transformed into tristimulus values (e.g. colorimeters, spectrophotometers, etcetera).

$I_j[0]$ is the $N_j \times 3$ array that holds $N_j$ pixel values (expressed in a trichromatic colour space) obtained from the image of the jth region of interest in the tweaked (light) scene. j is a positive integer number ranging from 1 to $N_r$, where $N_r$ is the number of regions of interest monitored in the lighting scene.

$I_j[i]$ is the $N_j \times 3$ array that holds $N_j$ pixel (tristimulus) values (expressed in the same colour space as $I_j[0]$) resulting from the measurement at the ith sampling time of the jth region of interest in the rendered lighting scene. It is assumed that both images have undergone an image registration stage so that the contents of the images corresponding to same areas are aligned into same coordinate frames.

The comparison is performed by computing the (pixel-wise) colour difference between the $I_j[\overline{0}]$ and $I_j[i]$ images. To that purpose a suited colour difference equation is applied. Two possible choices are the so-called CIELAB $\Delta_{ab}$ or CIE DE2000 ($\Delta_{00}$) (which, in turn, can be further extended by application of either the S-CIELAB, CVDM or MOM models, enabling the consideration of spatially complex stimuli, chromatic adaptation and other aspects of the human visually system that have a great effect on the perceived image quality, refer for example to the publication "Sharpness rules", Johnson G. M. and Fairchild M. D., Proceedings of the Color Imaging Conference 2000, 1:24-30, 2000).

If only the jth area of interest in the lighting scene is considered, an $N_j \times 1$ array, which is referred to as $\Delta I_j[i]$ henceforth, results from the comparison. From this array, the mean value of the average colour difference can be computed. This (scalar) average value can be noted as $\delta I_j[i]$ and be used to summarise the difference.

$$\delta I_j[i] = \Delta\bar{I}_j[i] = \frac{1}{N_j} \sum_{i=1}^{N_j} (\Delta_{xy}(I_j[i], I_j[0])) \quad (8)$$

From now on the scalar computed colour difference $\delta I_j[i]$ can be used in the same way $\delta r_j[i]$ has been earlier presented in order to check the occurrence of any change. The choice of average values of colour differences over regions of interest increases the robustness of the change detection with regards to lack of accuracy in the image registration process.

In the following, the characterisation and use of the detected changes is described, which may take place in step S14.

Once one or more areas of interest where a new rendering could be advisable have been identified, it must be tested whether at the said areas the deviation with regards to the tweaked scene is large enough to make advisable a new rendering of the lighting scene. This can be easily checked through the readings of the different sensors, that is verifying that the average over the defined time window of the measured values lies still within the limits. If that is not the case then the interferer or event needs to be characterised in order to take it into account in a new rendering stage.

Now, a light control system is considered, which uses images (or numerical arrays holding photometric values) as input to the system to specify the intended light distribution(s) over areas of interest on certain work surfaces.

For such a light management system the detected alien light sources or interferers should be preferably incorporated to the calculation of the solution as constraints or boundary conditions. To realise that, a format that is compatible with that used for specifying the target needs to be used. In other words, if images were used to specify the target light distribution, also an image should be used to identify a disturbance.

For such a light control system, the capabilities of the light sources have been stored as either images (expressed in a suited colour space), or arrays of photometric measurements. Then, according to what colour science teaches, the superposition principle holds and therefore if spatially matching (That is the reason why image registration should be used to handle the images acquired with camera-like detectors) measurements of the effects generated by the individual light sources at a certain location are available, they can be used to predict how the joint effect of all of the implied sources shall look like by simply adding their values up.

Accordingly, if spatially matching measurements of an identified disturbance are available, they can also be added in order the system to take it into account when calculating suited control values that compensate for it. Thence, if a disturbance has been located in the $j_0$th area of interest and $i_0$ denotes the last sampling period, it can be straightforwardly characterised as the difference between its last measurement(s) and the corresponding one(s) in the tweaked scene. That is for camera-like detectors, $$D_{j0}[i_0]=I_{j0}[i_0]-I_{j0}[0] \quad (9)$$

where the matrices $I_{j0}$□ are supposed to be expressed in a linear colorimetric colour space as for instance CIE XYZ, LMS or RIMM RGB so that the direct subtraction of colour coordinates yields is valid to characterise the disturbance in terms of colour (Note that spectral readings, from spectrophotometers or multispectral cameras, could be handled similarly as well, since their measurements are also additive).

On the other hand, similarly, if non-camera like detectors have detected any interference in the j0th area of interest and i0 denotes the last sampling period, the collection of difference with regards to the tweaked scene can be used to characterise it (as long as the superposition principle holds for the measured magnitude, which is normally the case for most light-related and photometric magnitudes (e.g. illuminance, luminance) relevant to illumination engineering)

$$d_{j0,k0}[i_0]=\rho_{j0,k0}[i_0]-\rho_{j0,k0}[0] \quad (10)$$

Alternatively, instead of just using the last measurement to characterise the interferer, a moving average could do a much better job in some instances by applying the recursions $$D_{j0}[n+1]=\alpha D_{j0}[n]+(1-\alpha)(D_{j0}[n]-D_{j0}[n-1]$$

$$d_{j0,k0}[n+1]=\alpha d_{j0,k0}[n]+(1-\alpha)(d_{j0,k0}[n]-d_{j0,k0}[n-1] \quad (11)$$

where α acts as the forgetting factor, which gives more (or less) weight to more recent measurements.

Once the interferers have been located and their influence mathematically characterised, they can be incorporated in a method for automatically rendering a lighting atmosphere or scene from an abstract description, particularly in step S16. As mentioned, the algorithms used to automatically compute the control values and configuration settings of the installed lighting can consider the effects of the interferers by adding them and the intended light distribution be realised. However, previous to any computation it would be advisable, whenever possible, to perform a check of the functionality of any light fixture (or lamp) that illuminates any work surface or region of interest where a disturbance has been detected. The reason for that is that detected disturbances may also be generated by malfunctioning lighting hardware. Consequently, if any lighting is unavailable, the algorithms should be aware of this circumstance in order not to use any faulty components to render the lighting atmosphere and therefore to consider that during calculation.

FIG. 2 shows a block diagram of a light control system 10 for automatically rendering a lighting scene with a lighting system. The light control system 10 generates configuration settings 12 for lighting modules of a lighting system (not shown).

The light control system comprises a monitoring unit 14 for scanning the lighting scene rendered by the lighting system, particularly for the occurrence of interference in the rendered lighting scene. The monitoring unit 14 receives signals from sensors 20, 22, and 24, which are located at different locations in a room and are adapted to measure lighting parameters at these different locations. The sensors may be for example a camera or a photodetector. The monitoring unit 14 is particularly adapted to perform the step 10 of the method shown in FIG. 1. Thus, the monitoring unit 14 may be implemented by a processing unit which executes a software implementing step S10.

The result of the scanning is forwarded from the monitoring unit 14 to a characterization unit 16, which is adapted to characterize the scanned occurrence of interference. The characterization unit 16 is further adapted to compare the characterized occurrence of the interference with reference values and to decide whether an adaptation of the lighting scene is required or not. If an adaptation is required, the characterization unit 16 is adapted to trigger a reconfiguration of the rendered lighting scene by sending a trigger signal to a reconfiguration unit 18. Particularly, the characterization unit 16 may be adapted to perform the steps S12 and S14 of the method shown in FIG. 1. It may be also implemented by a processing unit which executes a software implementing steps S12 and S14.

The reconfiguration unit 18 is adapted to initiate a new process of rendering a lighting scene on the basis of the result of the characterization of the occurrence of the interference and to apply the newly rendered lighting scene as newly computated configuration settings 12 to the lighting system for creating the new lighting scene. Particularly, the reconfiguration unit 18 may be adapted to perform the steps S16 and S18 of the method shown in FIG. 1. Thus, it may be implemented by a processing unit which executes a software implementing steps S16 and S18.

A computer 26 is connected with the light control system 10 and enables an end-user to fine-tune a rendered lighting scene, via a dedicated software with a graphical user interface (GUI), which may for example represent the layout of the room with the lighting system and the possible light effects of the lighting system. Furthermore, a database 28 is provided and connected with the light control system 10. The database 28 may store parameters of the lighting system, particularly configuration settings for the lighting system, such as a zero scene setting or a tweaked scene setting. Also, an end-user may store the setting of a fine-tune lighting scene via the GUI of the computer 26 in the database 28. Also, data recordings of the scanned lighting scene may be stored on the database 28, for example automatically by the light control system 10 at regular time intervals, particularly for further processing such as statistical investigations to be performed by the characterization unit 16 for detecting changes of a lighting scene.

The herein described invention can be applied to the automatic configuration, monitoring and control of an indoor lighting infrastructure to render a complex lighting atmosphere. Particularly, the herein described invention enables an automatic light control system to monitor during run-time the rendering of a lighting scene to check and provide for the correct reproduction of its elements at different work surfaces. The supervision of the rendered lighting scene allows the light control system to trigger policies that can compensate for unwanted and unexpected deviations perhaps caused by malfunctioning of light sources or by incorporation to the scene of non-controllable light sources (e.g. sunlight, allowing this way for daylight harvesting and thence yielding higher energy efficiency or artificial light sources). The invention can be run on top of any automatic lighting control system operating in an open-loop fashion, providing advanced self-healing features to it.

Consequently, the invention can be reckoned as part of an advanced, future-proof lighting management system for highly complex and versatile installations. Furthermore, the solution herein disclosed might be an ideal supplemental to a method or system for automatically rendering a lighting atmosphere or scene from an abstract description.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A light control method for automatically rendering a lighting scene with lighting system, comprising:

monitoring the rendered lighting scene for the occurrence of an interference, comprising:

scanning the rendered lighting scene including taking samples at given measurement points over a period of time; and detecting a significant deviation of the scanned lighting scene with respect to a reference lighting scene by processing the samples including comparing the samples with reference values, wherein the comparing comprises one of the following:

averaging over regions of interest a computed difference between readings of a user-tuned lighting scene and the rendered lighting scene, low-pass filtering the computed difference, and comparing the low-pass filtered computed difference with a threshold value in order to determine whether a significant variation in the mean of samples has occurred during the last observed periods of time; or defining a time window embracing the last periods of time previous to a current sample, estimating a predictor from the samples taken during the defined time window, running a generalised likelihood ratio test, and comparing the result of the generalised likelihood ratio test with a threshold value in order to determine whether a change has occurred in the monitored magnitude over a certain region of interest; and automatically reconfiguring the lighting system such that a monitored occurrence of an interference is compensated.

2. The method according to claim 1, wherein the step of automatically reconfiguring of the lighting system comprises:

triggering a process of characterisation of an interference from the detected significant deviation, and performing a computation of configuration settings for the lighting system to counteract the characterized interference depending on the characterisation.

3. The method of claim 2, further comprising photometric characteristic plots or mathematical models derived therefrom, which characterize the behaviour of the hardware of the lighting system to be controlled.

4. The method of claim 3 wherein the photometric characteristic plots or models provide the relationship between configuration settings of light modules of the lighting system and an expected output of the light modules at reference points or work surfaces.

5. A light control method for automatically rendering a lighting scene with lighting system, comprising:

monitoring the rendered lighting scene for the occurrence of an interference, comprising:

scanning the rendered lighting scene; and detecting a significant deviation of the scanned lighting scene with respect to a reference lighting scene; and automatically reconfiguring the lighting system such that a monitored occurrence of an interference is compensated, comprising:

triggering a process of characterisation of an interference from the detected significant deviation, and performing a computation of configuration settings for the lighting system to counteract the characterized interference depending on the characterization including photometric characteristic plots or mathematical models derived therefrom, which characterize the behavior of the hardware of the lighting system to be controlled.

* * * * *